United States Patent
Gurovich et al.

(10) Patent No.: US 9,501,875 B2
(45) Date of Patent: Nov. 22, 2016

(54) METHODS, SYSTEMS AND APPARATUS FOR DETERMINING WHETHER ANY VEHICLE EVENTS SPECIFIED IN NOTIFICATION PREFERENCES HAVE OCCURRED

(71) Applicant: GM GLOBAL TECHNOLOGY OPERATIONS LLC, Detroit, MI (US)

(72) Inventors: Danilo E. Gurovich, Grosse Pointe Farms, MI (US); Keith A. Fry, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 14/069,238

(22) Filed: Oct. 31, 2013

(65) Prior Publication Data
US 2015/0120083 A1    Apr. 30, 2015

(51) Int. Cl.
*G07C 5/00*      (2006.01)
*G07C 5/08*      (2006.01)
(Continued)

(52) U.S. Cl.
CPC ............ *G07C 5/008* (2013.01); *B60R 25/102* (2013.01); *G08B 21/18* (2013.01); *G08G 1/205* (2013.01); *G07C 5/0816* (2013.01); *G07C 5/0841* (2013.01); *G08B 25/10* (2013.01)

(58) Field of Classification Search
CPC ... G07C 5/008; G07C 5/0841; G07C 5/0816
See application file for complete search history.

(56) References Cited

U.S. PATENT DOCUMENTS 6,937,141 B2 *  8/2005  Muramatsu ............ B60R 25/04
                                                              340/426.13
(Continued)

FOREIGN PATENT DOCUMENTS

CN          103035048 A      4/2013

OTHER PUBLICATIONS

Bianchessi et al., "A Flexible Architecture for Managing Vehicle Sharing Systems," IEEE Embedded Systems Letters, vol. 5, No. 3, Sep. 2013, pp. 30-33.*

(Continued)

*Primary Examiner* — Todd Melton
(74) *Attorney, Agent, or Firm* — Lorenz & Kopf, LLP (57) ABSTRACT

Computer-implemented methods, systems and apparatus are disclosed for monitoring and reporting notification preferences. A processor of a vehicle determines whether any vehicle events specified in notification preferences have occurred. The notification preferences can be defined by an owner of the vehicle and specify vehicle events that the owner wants to be monitored and reported. When the processor determines that any vehicle event specified in the notification preferences has occurred, the processor can store a record of the vehicle event (and any other vehicle events that occur) in a vehicle event detection log, and then regularly or periodically generate a notification report that includes records for each of the vehicle events that are stored in the vehicle event detection log. The notification report can then be communicated to a remote computer located outside the vehicle. In addition, some vehicle events can trigger generation and communication of an alert message to the remote computer.

22 Claims, 4 Drawing Sheets

(51) Int. Cl.
*G08B 21/18* (2006.01)
*G08G 1/00* (2006.01)
*B60R 25/102* (2013.01)
*G08B 25/10* (2006.01)

(56) References Cited

U.S. PATENT DOCUMENTS

| | | | |
|---|---|---|---|
| 6,950,020 B2* | 9/2005 | Shimamoto | B60R 25/102 340/425.5 |
| 8,321,933 B2 | 11/2012 | Traenkenschuh et al. | |
| 8,463,488 B1* | 6/2013 | Hart | 701/32.3 |
| 8,630,747 B2* | 1/2014 | Burcham | G06F 21/10 701/2 |
| 2008/0148374 A1 | 6/2008 | Spaur et al. | |
| 2008/0319602 A1* | 12/2008 | McClellan | G07C 5/008 701/31.4 |
| 2013/0212659 A1* | 8/2013 | Maher | H04L 63/06 726/6 |
| 2014/0094989 A1* | 4/2014 | Dadu et al. | 701/1 |
| 2015/0045983 A1* | 2/2015 | Fraser et al. | 701/1 |

OTHER PUBLICATIONS

Bouard et al., "Middleware-Based Security and Privacy for In-car Integration of Third-Party Applications," Trust Management VII, Proceedings of the 7th IFIP WG 11.11 International Conference, Jun. 2013, pp. 17-32.*

Iwai et al., "Automotive Cloud Service Systems Based on Service-Oriented Architecture and Its Evaluation," 2011 IEEE International Conference on Cloud Computing, Jul. 2011, pp. 638-645.*

State Intellectual Property Office of the People'S Republic of China, Office Action in Chinese Patent Application No. 201410599532.1 mailed Jun. 15, 2016 (003.1087CN).

* cited by examiner

METHODS, SYSTEMS AND APPARATUS FOR DETERMINING WHETHER ANY VEHICLE EVENTS SPECIFIED IN NOTIFICATION PREFERENCES HAVE OCCURRED

TECHNICAL FIELD

The technical field generally relates to vehicles, and more particularly relates to methods, systems and apparatus for determining whether any vehicle events specified in notification preferences have occurred, generating notification reports and/or generating alert messages.

BACKGROUND

Many vehicles today include on-board computers that perform a variety of functions. For example, on-board computers control operation of the engine, control systems within the vehicle, provide security functions, perform navigation tasks, and facilitate communications with remote driver-assistance centers that can provide services including in-vehicle safety and security, navigation, and remote-diagnostics.

When an owner (or other authorized operator) allows another person to take control of or use their vehicle and the owner is not present, there is very little information available with respect to what happened during the time that the vehicle was out of their possession.

It would be desirable to provide methods, systems and apparatus that allow an owner of a vehicle to accurately track what is happening or what has happened to their vehicle when the owner is not present and another person access it or operates it. Other desirable features and characteristics of the disclosed embodiments will become apparent from the subsequent detailed description and the appended claims, taken in conjunction with the accompanying drawings and the foregoing technical field and background.

SUMMARY

In accordance with an embodiment a method is provided. In accordance with the method, a processor of a vehicle determines whether any vehicle events specified in notification preferences have occurred. In one embodiment, the notification preferences are defined by an owner of the vehicle and specify vehicle events that the owner wants to be monitored and reported when a monitoring service is activated (e.g., by the owner of the vehicle while he/she is away from their vehicle). When the processor determines that a vehicle event specified in the notification preferences has occurred, the processor can then determine, based on the notification preferences, whether the vehicle event that has occurred is to trigger communication of an alert message from the processor, and if so, the processor can generate the alert message and communicate it to a remote computer located outside the vehicle (e.g., a consumer electronics device or other remote computer associated with the owner). In addition, in some embodiments, the processor can also store a record of the vehicle event (and any other vehicle events that occur) in a vehicle event detection log, and then regularly or periodically generate a notification report that includes records for each of the vehicle events that are stored in the vehicle event detection log. This notification report can also be communicated to the remote computer.

In another embodiment, a system is provided that includes a remote computer, and a vehicle comprising a processor. The processor can determine whether any vehicle events specified in notification preferences have occurred. When the processor determines that a vehicle event specified in the notification preferences has occurred, the processor can store a record for that vehicle event in a vehicle event detection log, and can determine whether that vehicle event is to trigger an alert message from the processor. If so, the processor can generate an alert message and communicate the alert message to the remote computer. The processor can regularly or periodically generate a notification report comprising the records for each of the vehicle events that are stored in the vehicle event detection log, and communicate the notification report to the remote computer.

In another embodiment, a vehicle is provided having a processor and a memory configured to store a vehicle event detection log. The processor determines whether any vehicle events specified in notification preferences have occurred. Each time the processor determines that a vehicle event specified in the notification preferences has occurred, the processor stores a record for that vehicle event in the vehicle event detection log. In addition, when the processor determines that any vehicle event specified in the notification preferences has occurred, the processor can further determine, based on the notification preferences, whether that vehicle event is to trigger communication of an alert message from the processor. When the processor determines that the vehicle event that has occurred is to trigger communication of an alert message, the processor generates the alert message and communicates it to a remote computer. The processor can also regularly generate a notification report that includes the records for each of the vehicle events that have occurred and that are stored in the vehicle event detection log, and communicate the notification report to the remote computer.

DESCRIPTION OF THE DRAWINGS

The exemplary embodiments will hereinafter be described in conjunction with the following drawing figures, wherein like numerals denote like elements, and wherein.

DETAILED DESCRIPTION

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, "exemplary" and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to methods, systems and apparatus that allow an owner of a vehicle to accurately track what is happening or what has happened to their vehicle when the owner is not present and another person access or operates it either with or without the owner's authorization.

The owner of the vehicle can set notification preferences for their vehicle that will be monitored by a monitoring service implemented at a processor of the vehicle. The monitoring service can be activated (e.g., enabled or turned on), for example, when the owner is away from his/her vehicle including when the owner allows another to use or have access to his/her vehicle but is not present in the vehicle (e.g., while another person has the opportunity to access and/or operate the owner's vehicle).

When the monitoring service is activated, information about vehicle events (specified by the notification preferences) can be monitored and stored in a log. Reports about the vehicle events that are stored in the log can then be used to generate a notification report. The notification report can include information about vehicle events (specified by the notification preferences) that occurred while the monitoring service was activated. This way the owner of the vehicle can review the notification report to confirm that their vehicle was being operated as expected when they were not present.

Further, in some embodiments, the notification service can also generate real-time alert messages to alert the owner about specific vehicle events when they occur. Alert messages can be generated and sent to the owner whenever the vehicle is operated outside of parameters specified in the notification preferences set by the owner. For instance, in one implementation, certain vehicle events (specified by the owner) can be monitored and compared against pre-set limits or thresholds set by the owner when specifying their notification preferences. Whenever the vehicle exceeds any of these pre-set limits, the owner can receive an alert message that indicates which limits were exceeded.

The disclosed embodiments can be useful when the owner allows another person, such as their child, spouse, friend, employee, a parking valet, etc., to operate the vehicle when the owner is not present. Notably, the disclosed embodiments can be implemented using existing hardware with some additional software applications added at a remote computer (such as a consumer electronics device (CED) of the owner or another computer located outside the vehicle), and at an onboard computer system of the vehicle.

The system and related methods will now be explained below with reference to FIGS. 1-4.

Figure 1:
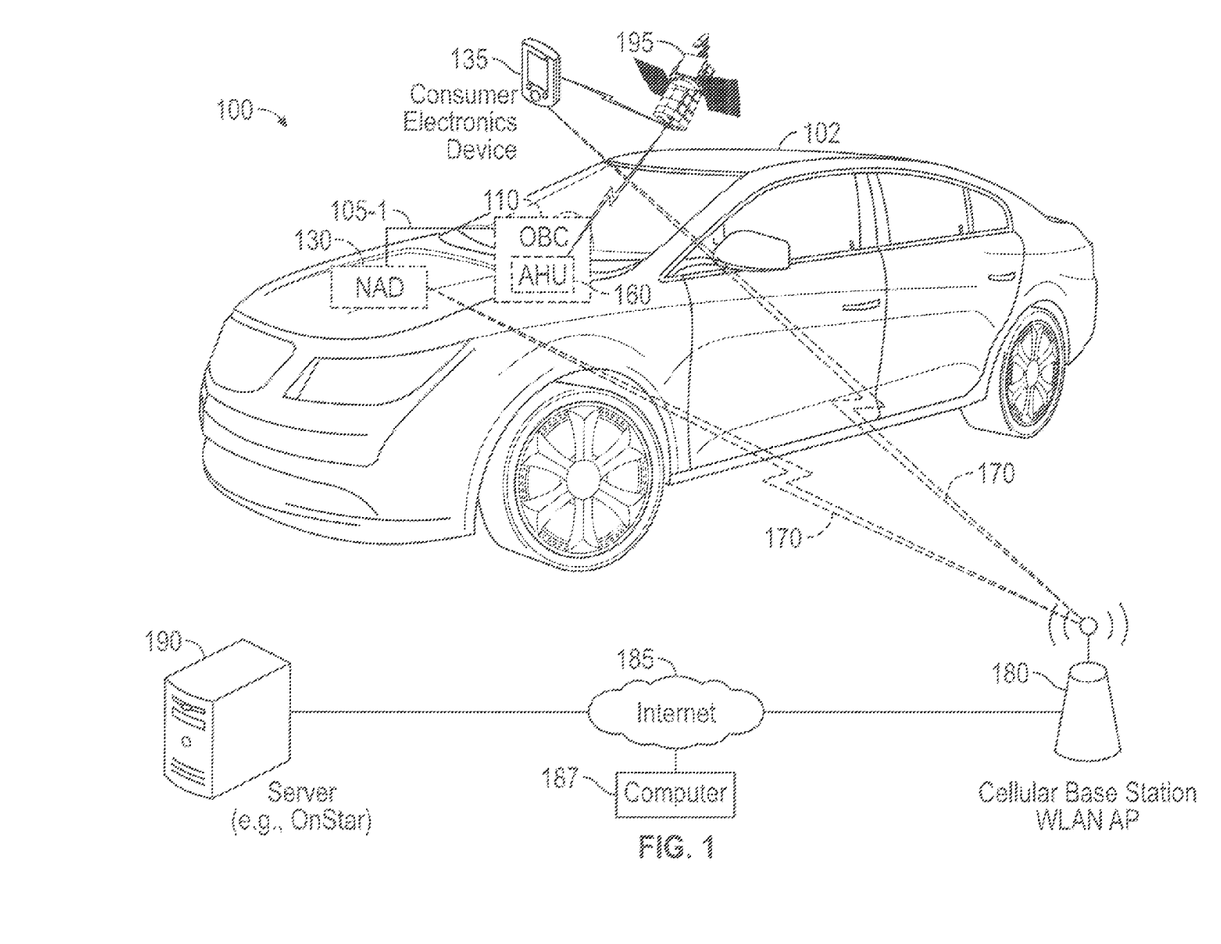
FIG. 1 is a communication system in accordance with some of the disclosed embodiments.

FIG. 1 is a communication system 100 in accordance with some of the disclosed embodiments. The communication system 100 includes a vehicle 102, a consumer electronics device (CED) 135 associated with the owner of the vehicle 102, communication infrastructure 180, a network 185 such as the Internet, a computer 187, a server 190 (e.g., a telematics server), and a Global Positioning System (GPS) satellite 195.

The vehicle 102 includes an embedded network access device (NAD) 130 that is communicatively coupled to an onboard computer system 110 of the vehicle 102. The onboard computer system 110 includes an automotive head unit (AHU) 160. The embedded NAD 130 and the AHU 160 can be communicatively coupled over any type of communication link including, but not limited to a wired communication link such as a bus 105-1 or USB connection, or a wireless communication link such as a Bluetooth communication link or WLAN communication link, etc. An example implementation of the onboard computer system 110 will be described below with reference to FIG. 2. Further, it is noted that although the embedded NAD 130 and AHU 160 are illustrated as separate blocks that are coupled via the bus 105-1, in other embodiments, the NAD 130 can be part of the AHU 160.

The NAD 130 is a communication device that is physically and mechanically integrated/embedded within the vehicle 102. The embedded NAD 130 allows the vehicle 102 to communicate information over-the-air using one or more wireless communication links 170. The embedded NAD 130 allows the onboard computer system 110 including the AHU 160 of the vehicle 102 to exchange information over wide area networks 185, such as the Internet, and to communicate with external networks and infrastructure such as the server 190 so that they can communicate and share information with each other. This information can be in the form of packetized data that can include data, control information, audio information, video information, textual information, etc.

The CED 135 (also referred to below simply as a device 135) can be any type of electronics device that is capable of wireless communication with a network. As will be described below with reference to FIG. 2, the CED 135 includes elements such as a transceiver, computer readable medium, processor, and a display. The CED 135 can be, for example, any number of different portable wireless communications devices, such as personal or tablet computers, cellular telephones, smartphones, etc.

In the embodiment of FIG. 1, the CED 135 is a smartphone. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, personal digital assistant (PDA) functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

The CED 135 is Bluetooth-enabled meaning that it includes a Bluetooth-compliant communication interface including a Bluetooth antenna and a Bluetooth chipset having a Bluetooth controller and a host (not illustrated in FIG. 1) as defined in the any of the Bluetooth communication standards. The Bluetooth chipset generates signals to be transmitted via the Bluetooth antenna, and also receives signals transmitted from other Bluetooth-enabled interfaces via their Bluetooth antennas. In this regard, it is noted that the CED 135 and a Bluetooth interface (not illustrated) of the vehicle 102 both include a Bluetooth antenna (not illustrated) and one or more Bluetooth chipset(s) (not illustrated) so that they are capable of implementing all known Bluetooth standards and protocols including a Bluetooth Low Energy (BLE) protocol.

Because the CED 135 is portable it can be present inside the vehicle 102 (e.g., when carried into the vehicle 102 by a person such as the owner), or can be located outside the vehicle 102. For instance, the CED 135 can be carried close to or inside the vehicle 102 or can be carried relatively far away from the vehicle 102. When the CED 135 is located in communication range of a wireless communication interface of the AHU 160, the CED 135 can establish a wireless connection with the wireless interface of the AHU 160 over a short-range wireless communication link. The CED 135 can also be carried into the vehicle 102 by an occupant and can then be communicatively coupled to the USB ports via wired connection 105-2. When the CED 135 is coupled to the AHU 160, it can transmit information to the AHU 160 or receive information from the AHU 160 as data packets (e.g., as IP packets) via a USB connection to ports or via a Bluetooth or WLAN link to corresponding interfaces. When the CED 135 is located outside the vehicle 102 (e.g., when removed from the vehicle 102), and it moves outside communication range of the wireless interface of the AHU 160 its communication link and connection with the wireless interface of the AHU 160 can be disrupted (e.g., terminated).

In this context, the term "connected" means that the CED 135 and at least one wireless communication interface of the onboard computer system 110 (e.g., WLAN interface 266 or Bluetooth interface 266 or a wireless interface implemented at the embedded NAD 130) have established a connection and are presently in a connected state that allows them to communicate with one another. The "connection" between the CED 135 and the onboard computer system 110 can be a wireless point-to-point connection over a short range wireless communication link (e.g., Bluetooth or WLAN communication link).

As will be described in greater detail below, the CED 135 can be referred to as a master CED when it is associated with an owner of the vehicle. It is also noted that, when the disclosed embodiments are implemented, the master CED can be located anywhere with respect to the vehicle 102 (including far away such that a wireless connection cannot be established with a short-range wireless communication interface of the onboard computer system 110 of the vehicle 102).

The communication infrastructure 180 is communicatively coupled to the server 190 through a network 185, such as, the Internet. The communication infrastructure 180 allows the NAD 130 to communicate with the external networks and the remotely located server 190 over wireless communication link(s) 170. Communication infrastructure 180 can generally be any public or private access point that provides an entry/exit point for the NAD 130 to communicate with an external communication network 185 over wireless communication link(s) 170. Communications that utilize communication infrastructure 180 are sometimes referred to colloquially as vehicle-to-infrastructure, or V2I, communications. Depending on the implementation, the communication infrastructure 180 can be a cellular base station, a WLAN access point, a satellite, etc. that is in communication with server 190 via network 185. Thus, the communication infrastructure 180 can include, for example, long-range communication nodes (e.g., cellular base stations or communication satellites) and shorter-range communication nodes (e.g., WLAN access points) that are communicatively connected to the communication network 185. In one embodiment, the wireless communication link 170 can be, for example, a third-generation (3G) or fourth generation (4G) communication link. Communications between NAD 130 and shorter-range communication nodes are typically facilitated using IEEE 802.x or Wi-Fi®, Bluetooth®, or related or similar standards.

The network 185 can include a wide area network, such as one or more of a cellular telephone network, the Internet, Voice over Internet Protocol (VoIP) networks, local area networks (LANs), wide area networks (WANs), personal area networks (PANs), and other communication networks. Communications from the NAD 130 to the remote server 190, and from the remote server 190 to the NAD 130, can traverse through the communication network 185.

The server 190 is a backend server (or servers) that include computer hardware for implementing the server 190 that can provide information/content that can then be communicated over a network 185, such as the Internet, to communication infrastructure 180. The server 190 can be a telematics server that provides services to the vehicle 102 such as Global Positioning System (GPS) services and theft prevention, alert and warning services. In some implementations, the server 190 can be associated with a commercial service (e.g., OnStar) that generates information and communicates it over the network 185 to communication infrastructure 180.

Further details regarding this system 100 will now be described below with reference to FIGS. 2 and 3.

Figure 2:
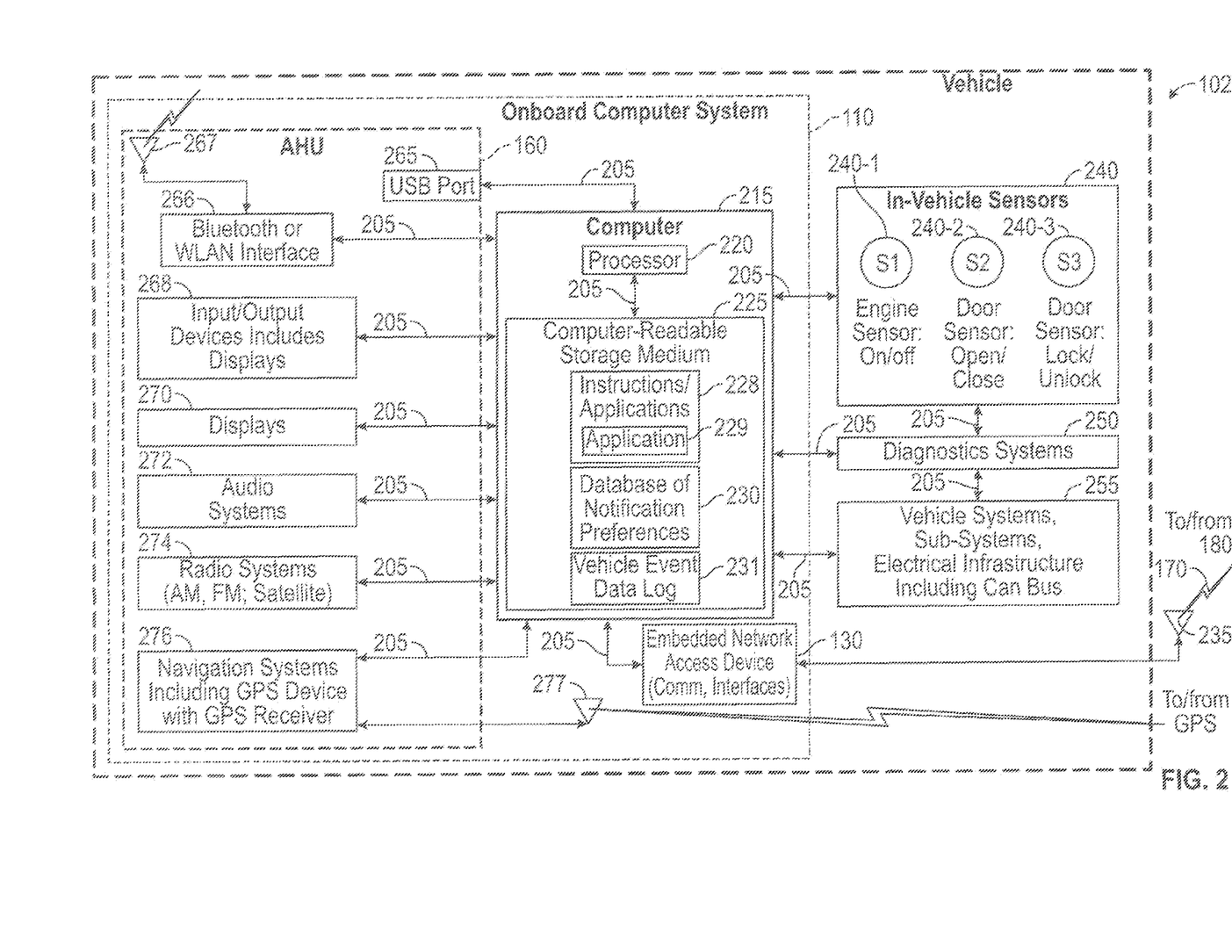
FIG. 2 is a diagram that illustrates a portion of a vehicle in accordance with one exemplary implementation of the disclosed embodiments.

FIG. 2 is a diagram that illustrates a portion of a vehicle 102 in accordance with one exemplary implementation of the disclosed embodiments. The vehicle 102 includes an onboard computer system 110, vehicle sensors 240, vehicle diagnostic systems 250, and vehicle systems, sub-systems and electrical infrastructure 255.

In the particular example that is illustrated in FIG. 2, the onboard computer system 110 includes the embedded NAD 130, the AHU 160 and a computer 215. The embedded NAD 130, the AHU 160 and the computer 215 are coupled to each other via one or more in-vehicle buses 205 that are illustrated in FIG. 2 by one or more bus line(s) 205. The bus 205 includes various wired paths that are used to interconnect the various systems and route information between and among the illustrated blocks of FIG. 2. As used herein, the bus 205 can include any internal vehicle bus.

Although the embedded NAD 130, the AHU 160 and the computer 215 are illustrated as being part of the onboard computer system 110, those skilled in the art will appreciate that the embedded NAD 130, the AHU 160 and the computer 215 (and the various sub-blocks thereof) can separate units that can be distributed throughout the vehicle 102. Thus, although certain blocks are indicated as being implemented with the onboard computer system 110, in other embodiments, any of these blocks can be implemented elsewhere within the vehicle 102 inside the onboard computer system 110.

The computer 215 includes at least one computer processor 220 that is in communication with a tangible, non-transitory processor-readable storage medium 225 (e.g., computer memory) by way of a direct memory access (DMA) bus 206 or other such computing infrastructure. The processor 220 is illustrated in one block, but may include various different processors and/or integrated circuits that collectively implement any of the functionality described herein. The processor 220 includes a central processing unit (CPU) that is in communication with the processor-readable storage medium 225, and input/output (I/O) interfaces that are not illustrated in FIG. 2 for sake of clarity. In some implementations, these I/O interfaces can be implemented at I/O devices 268, displays 270, and audio systems 272 that are shown within the AHU 160. An I/O interface (not illustrated) may be any entry/exit device adapted to control and synchronize the flow of data into and out of the CPU from and to peripheral devices such as input/output devices 268, displays 270, and audio systems 272.

As will be explained in greater detail below, the processor 220 can receive information from each of the other blocks illustrated in FIG. 2 (e.g., information provided over a bus within the vehicle or over wide area networks, such as the Internet, information such as video data, voice data, e-mail, information from diagnostics systems, information detected by the sensors 240, information provided by the vehicle diagnostic systems 250, information provided by the vehicle systems, sub-systems and electrical infrastructure 255, information provided by the navigation systems 276, etc.), process this information, and generate communications signals that convey selected information to any of the other blocks illustrated in FIG. 2.

The term processor-readable medium and variants thereof, as used in the specification and claims, refer to any known non-transitory computer storage media that can include any known form of computer-usable or processor-readable medium. The processor-readable (storage) medium 225 can be any type of memory technology including any types of read-only memory or random access memory or any combination thereof. For example, storage media could include any of random-access memory (RAM), read-only memory (ROM), electrically erasable programmable read-only memory (EEPROM), solid state memory or other memory technology, CD ROM, DVD, other optical disk storage, magnetic tape, magnetic disk storage or other magnetic storage devices, and any other medium that can be used to store desired data. The processor-readable (storage) medium 225 encompasses a wide variety of memory technologies that include, for example but not limited to, an electronic, magnetic, optical, electromagnetic, infrared, or semiconductor system, apparatus, device, or propagation medium. Some non-limiting examples can include, for example, volatile, non-volatile, removable, and non-removable memory technologies. For sake of simplicity of illustration, the processor-readable medium 225 is illustrated as a single block within computer 215; however, the processor-readable storage medium 225 can be distributed throughout the vehicle including in any of the various blocks illustrated in FIG. 2, and can be implemented using any combination of fixed and/or removable storage devices depending on the implementation.

The processor-readable storage medium 225 stores instructions 228 that, when executed by the processor, cause the processor 220 to perform various acts as described herein. The processor-readable storage medium 225 stores instructions 228 that can be loaded at the processor 220 and executed to generate information that can be communicated to the AHU 160, the embedded NAD 130 and any of the other blocks illustrated in FIG. 2. The instructions 228 may be embodied in the form of one or more programs or applications 229 that may be stored in the medium 225 in one or more modules. While instructions 228 are shown generally as residing in/at the processor-readable storage medium 225, various data, including the instructions 228 are in some embodiments stored in a common portion of the storage medium, in various portions of the storage medium 225, and/or in other storage media.

In accordance with the disclosed embodiments, the application 229 includes computer-executable instructions that when executed by a processor can be used to (1) set the owner's notification preferences, (2) turn a notification service on and off (or enable/disable), (3) receive and process information/data received, for example, from any vehicle system (e.g., the sensors 240, information provided by the vehicle diagnostic systems 250, information provided by the vehicle systems, sub-systems and electrical infrastructure 255 including information communicated a Controller Area Network (CAN) bus, information provided by the navigation systems 276 including a GPS receiver), and then determine whether that information/data meets notification preferences specified or set by the owner of the vehicle, and (4) generate and communicate notification reports and/or alert messages. The application can run at any processor within the vehicle, such as processor 220. As is known in the art, a CAN bus is a vehicle bus standard designed to allow microcontrollers and devices to communicate with each other within a vehicle without a host computer. Among other things, a CAN bus allows electronic control units (ECUs) for various sub-systems, which are collectively represented by processor 220 in FIG. 2) to communicate with each other. For instance, the CAN bus can allow control units such as an engine control unit (also engine control module/ECM or Powertrain Control Module/PCM), transmission control unit, airbag control unit, antilock braking system (ABS) control unit, cruise control, electric power steering (EPS) control unit, audio systems, windows, doors, mirror adjustment, battery and recharging systems for hybrid/electric cars, etc. to communicate with one another.

The processor-readable storage medium 225 also includes a database 230 of notification preferences and a database called a vehicle event data log 231. As will be described in greater detail below, these notification preferences are specified by the owner. Among other things, the notification preferences specify particular vehicle events that are to be monitored and reported. As used herein, "notification preferences" can refer to information about vehicle events that are to be monitored and reported when the notification service is activated. Notification preferences can be set, configured or defined by the owner of the vehicle and are in this sense "user-configured" or "user-defined" by the owner of each vehicle. As used herein, a "vehicle event" can refer to information about the vehicle that an owner wants to monitor when the notification service is activated (e.g., while the owner is away from his/her vehicle). Vehicle events can be determined based on information information/data received, for example, from any vehicle system including those described above.

To explain further, when a notification service is activated, a processor in the vehicle (e.g., processor 220) monitors for vehicle events that are specified by the notification preferences. The processor collects information or data about certain vehicle events specified by the notification preferences, and stores this information in the vehicle event data log 231. This stored data about the vehicle events can then be used by the processor 220 to generate notification reports. In other words, the notification reports include information about the specified vehicle events that has been collected when the notification service is activated. The notification reports can then be communicated to one or more remote computers 135, 187 associated with the owner of the vehicle. In some embodiments, notification preferences related to notification reports include information about: types of vehicle events to be logged in a vehicle event detection log 232 and included in the notification report;

trigger conditions/thresholds associated with specific vehicle events which are evaluated to determine whether alert messages should be sent; parameters for logging information about vehicle events in the notification report (Geo Fence, On/Off number of times, Access from other doors besides Driver, Max Speed, etc.); format of the notification reports (e.g., text/SMS, e-mail, voice, etc.); delivery type of the notification reports; conditions for delivery of the notification reports to the owner (e.g., instant, saving for later (always active), on/off toggle based on whether the owner wishes to review immediately or just save for later); destination address of the CED or other computer that is to receive the notification report.

When a notification service is activated, and the processor in the vehicle (e.g., processor 220) determines that a vehicle event (specified by the notification preferences) has occurred, the processor can also determine, based on other information stored in the notification preferences, whether each vehicle event that has occurred should trigger generation and communication of an alert message. For example, in one embodiment, the notification preferences can specify parameters such that alert messages will be sent to the owner whenever the vehicle processor detects, observes or determines that a condition has occurred that is outside of the boundaries set in the limiting parameters. For instance, when the processor determines that a particular vehicle event meets a trigger condition specified by the notification preferences, the processor can generate alert messages that can be sent to the owner. In some embodiments, notification preferences related to alert messages can include information about: types of vehicle events that are to trigger the alert messages; trigger conditions/thresholds associated with specific vehicle events which are evaluated to determine whether alert messages should be sent; parameters for vehicle events that trigger communication of the alert messages; format of the alert messages; delivery type of the alert messages (e.g., text/SMS, e-mail, voice, Bluetooth, USB download, etc.); conditions for delivery of alert messages to the owner; destination address of the CED or other computer that is to receive the alert messages (e.g., owner's CED or other computer, etc.), etc.

The AHU 160 includes various infotainment system components that make up an infotainment system that provides passengers in the vehicle 102 with information and/or entertainment in various forms including, for example, music, news, reports, navigation, weather, and the like, received by way of radio systems, Internet radio, podcast, compact disc, digital video disc, other portable storage devices, video on demand, and the like.

In the example implementation illustrated in FIG. 2, the AHU 160 includes ports 265 (e.g., USB ports), one or more interface(s) 266 (e.g., Bluetooth and/or Wireless Local Area Network (WLAN) interface(s)) that includes one or more associated antennas 267, one or more input and output devices 268, one or more display(s) 270, one or more audio system(s) 272, one or more radio systems 274 and optionally a navigation system 276 that includes a global positioning system (GPS) receiver (not illustrated). The input/output devices 268, display(s) 270, and audio system(s) 272 can collectively provide a human machine interface (HMI) inside the vehicle.

The input/output devices 268 can be any device(s) adapted to provide or capture user inputs to or from the onboard computer 110. For example, a button, a keyboard, a keypad, a mouse, a trackball, a speech recognition unit, any known touchscreen technologies, and/or any known voice recognition technologies, monitors or displays 270, warning lights, graphics/text displays, speakers, etc. could be utilized to input or output information in the vehicle 102. Thus, although shown in one block for sake of simplicity, the input/output devices 268 can be implemented as many different, separate output devices 268 and many different, separate input devices 268 in some implementations. As one example, the input/output devices 268 can be implemented via a display screen with an integrated touch screen, and/or a speech recognition unit, that is integrated into the system 160 via a microphone that is part of the audio systems 272. As such, it is noted that the input/output devices 268 (that are not illustrated) can include any of a touch-sensitive or other visual display, a keypad, buttons, or the like, a speaker, microphone, or the like, operatively connected to the processor 220. The input can be provided in ways including by audio input. For instance, the onboard computer system 110 in some embodiments includes components allowing speech-to-data, such as speech-to-text, or data-to-speech, such as text-to-speech conversions.

The displays 270 can include any types and number of displays within the vehicle. For example, the displays 270 can include a visual display screen such as a navigation display screen or a heads-up-display projected on the windshield or other display system for providing information to the vehicle operator. The displays 270 can include multiple displays for a single occupant or for multiple occupants, e.g., directed toward multiple seating positions in the vehicle. Any type of information can be displayed on the displays 270 including information that is generated by the server 190 of FIG. 1.

The audio systems 272 can include speakers, microphones and other audio hardware and software components including voice-recognition software.

The radio systems 274 can include any known types of radio systems including AM, FM and satellite based radio systems.

The navigation systems 276 can include a global positioning system (GPS) device for establishing a global position of the vehicle, and other information such as heading, speed, acceleration, etc. The GPS device includes a processor and one or more GPS receivers that receive GPS radio signals via an antenna (not illustrated in FIG. 2). These GPS receivers receive differential correction signals from one or more base stations 180 either directly or via a geocentric stationary or LEO satellite 195, an earth-based station (e.g., cellular base station 180) or other means. This communication may include such information as the precise location of a vehicle, the latest received signals from the GPS satellites 195 in view, other road condition information, emergency signals, hazard warnings, vehicle velocity and intended path, and any other information. The navigation systems 276 can also regularly receive information such as updates to the digital maps, weather information, road condition information, hazard information, congestion information, temporary signs and warnings, etc. from a server. The navigation systems 276 can include a map database subsystem (not illustrated) that includes fundamental map data or information such as road edges, the locations of stop signs, stoplights, lane markers etc. that can be regularly updated information with information from a server. The navigation systems 276 can receive information from various sensors (not illustrated) as is known in the art.

The ports 265 and interfaces 266 allow for external computing devices including the CED 135 to connect to the onboard computer system 110. In some embodiments, the ports 265 can include ports that comply with a USB standard, and interfaces 266 can include interfaces that comply with a Bluetooth and/or WLAN standards. This way, the CED 135 can directly communicate (transmit and receive) information with the onboard computer system 110. This information can include data, control information, audio information, video information, textual information, etc.

The embedded NAD 130 and its associated antenna(s) 235 can be integrated within the vehicle 102. The embedded NAD 130 can be communicatively coupled to various components of an onboard computer system 110 via a wireless or wired connection including via bus 205. For example, the computer 215 of the onboard computer system 110 can be communicatively coupled to the embedded NAD 130 via one or more bus line(s) 205.

The NAD 130 can include at least one communication interface and at least one antenna 135, and in many cases can include a plurality of different communication interfaces. These communication interfaces can include one or more wireless communication interfaces that allow the embedded NAD 130 to communicate with communication infrastructure 180. The wireless communication interfaces of the embedded NAD 130 each include at least one transceiver having at least one receiver and at least one transmitter that are operatively coupled to at least one processor. The embedded NAD 130 can perform signal processing (e.g., digitizing, data encoding, modulation, etc.) as is known in the art.

The wireless communication interfaces that are included within the embedded NAD 130 can be implemented using any known wireless communications technologies. The embedded NAD 130 can use communication techniques that are implemented using multiple access communication methods including frequency division multiple access (FDMA), time division multiple access (TDMA), code division multiple access (CDMA), orthogonal frequency division multiple access (OFDMA) in a manner to permit simultaneous communication with communication infrastructure 180 of FIG. 1. The embedded NAD 130 can enable the vehicle to establish and maintain one or more wireless communications links 170 (e.g., via cellular communications, WLAN, Bluetooth, and the like). The physical layer used to implement these wireless communication links can be based on any known or later-developed wireless communication or radio technology. While the embedded NAD 130 is illustrated in a single box, it will be appreciated that this box can represent multiple different wireless communication interfaces including any number of long range wireless communication interfaces and any number of short range wireless communication interfaces. The embedded NAD 130 is illustrated as being part of the onboard computer system 110, but can be implemented via one or more separate chipsets (or integrated circuits (ICs). Each of the wireless communication interfaces can include multiple chipsets for implementation of the receivers, transmitters, and/or transceivers that are used for receiving and sending signals of various types, including relatively short-range communications or longer-range communications.

For example, the embedded NAD 130 can include wireless communication interfaces for relatively short-range communications that employ one or more short-range communication protocols, such as a dedicated short range communication (DSRC) system (e.g., that complies with IEEE 802.11p), a WiFi system (e.g., that complies with IEEE 802.11 a, b, g, IEEE 802.16, WI-FI®), BLUETOOTH®, infrared, IRDA, NFC, the like, or improvements thereof). Likewise, the embedded NAD 130 can include wireless communication interfaces for longer-range communications such as cellular and satellite based communications that employ any known communications protocols. In one embodiment, one of the wireless communication interfaces of the embedded NAD 130 is configured to communicate over a cellular network, such as a third generation (3G) or fourth generation (4G) cellular communication network. As such, the wireless communication links 170 that are shown in FIGS. 1 and 2 can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g. IEEE 802.11 or IEEE 802.16), WIMAX®, BLUETOOTH®, near field communications (NFC), the like, or improvements thereof (WI-FI is a registered trademark of WI-FI Alliance, of Austin, Tex.; WIMAX is a registered trademark of WiMAX Forum, of San Diego, Calif.; BLUETOOTH is a registered trademark of Bluetooth SIG, Inc., of Bellevue, Wash.).

The vehicle sensors 240, vehicle diagnostic systems 250, and other vehicle systems, sub-systems and electrical infrastructure 255 are communicatively coupled to the onboard computer system 110 via bus 205 or other communication link, which in one implementation can be a Controller Area Network (CAN) bus.

The onboard computer 110 is configured for receiving, processing and transmitting information received from sensors 240 that are part of the vehicle 102. The sensors 240 can include any known types of sensors employed in vehicles. The sensors 240 may be adapted to transmit and receive digital and/or analog signals. Illustrative sensors include analog or digital sensors, mechanical property sensors, electrical property sensors, audio or video sensors, or any combination thereof.

As a few non-limiting examples of the sensors that are includes, the sensors 240 include at least a first sensor 240-1 that is configured to detect or indicate the engine of the vehicle has been started or shut off, a group of second sensors 240-2 each of which can detect whether doors of the vehicle (or other compartments such as trunk, glove box, or console) have been opened or closed and generate an output signal that can be used to determine whether a door (or other compartment) of the vehicle has been opened, and a group of third sensors 240-3 that can each detect whether doors (or other compartments) of the vehicle have locked or unlocked and generate an output signal that can be used to determine whether a door of the vehicle has been unlocked.

The sensors 240 can also include other sensors (not illustrated) that can detect and/or be used to indicate when the vehicle 102 has moved or is moving, such as a velocity sensor that provides an accurate measure of the vehicle velocity relative to the ground (e.g., a wheel speed sensor or radar velocity meter). The sensors 240 can include sensors that can sense, for example, environmental information and/or vehicle operation information (e.g., speed/acceleration of the vehicle, wind conditions, internal or external temperature, precipitation, visibility, wheel traction, braking, suspension, etc.), and communicate this information to the onboard computer 110. The sensors 240 can also include sensors at various locations that are used to monitor apparatus that are used for controlling the vehicle such as a brake systems, steering systems, etc. The sensors 240 can also include temperature sensors, Pedal Position Sensors (PPSs), Throttle Position Sensors (TPSs), Mass Air Flow (MAF) sensors, Manifold Absolute Pressure (MAP) sensors, Tire Pressure Sensors, Crash Sensors, Fuel Level Sensors, Battery Charge State sensors, Airbag sensors, Engine Coolant Temperature sensors, Seat Belt Sensors, etc. The sensors 240 can also include infrared sensors mounted on the vehicle that can be used to determine the road temperature, the existence of ice or snow. The sensors 240 can also include one of more cameras that are mounted on the vehicle for interrogating environment nearby the host vehicle for such functions as blind spot monitoring, backup warnings, anticipatory crash sensing, visibility determination, lane following, and any other visual information.

The diagnostics systems 250 can include any known vehicle diagnostics technologies that can provide advanced warning of potential vehicle component issues. The diagnostics systems 250 can include diagnostics for engine systems, transmission systems, emissions systems, air bag systems, braking systems, navigations systems, etc. The diagnostics systems 250 can include, or reply on input from, various sensors 240 that illustrated in a separate block for sake of simplicity of illustration.

The vehicle systems, sub-systems and electrical infrastructure 255 can include any known vehicle systems, sub-systems and electrical infrastructure. The vehicle electrical infrastructure 255 can include the CAN bus or anything connected to the CAN bus.

The AHU 160 is in communication with the processor 220 and includes at least one short-range wireless communication interface 266 (e.g., Bluetooth interface and/or WLAN interface) that is configured to establish a wireless connection (e.g., Bluetooth connection and/or WLAN connection) with the CED 135 when in communication range of the CED 135.

Figure 3:
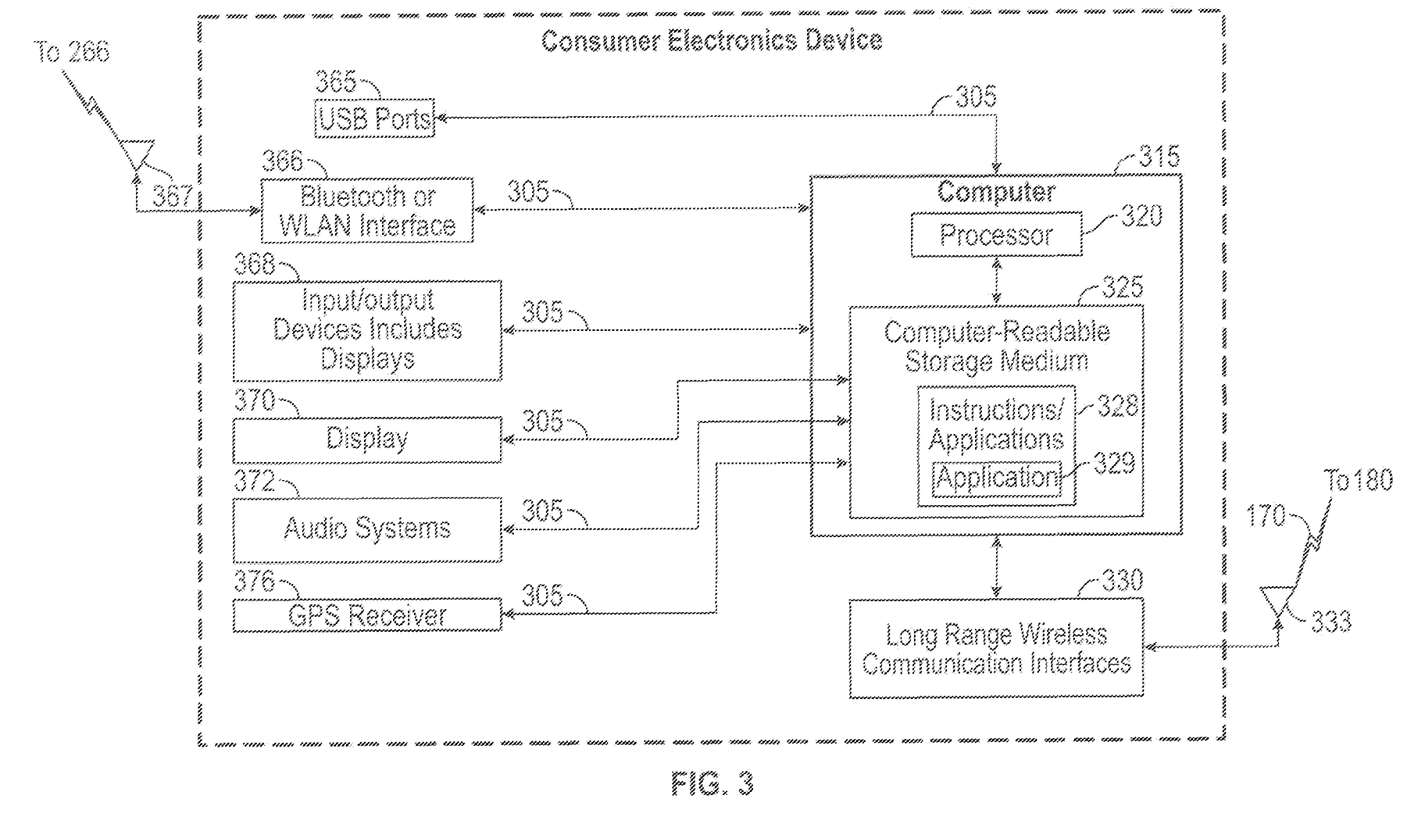
FIG. 3 is a diagram that illustrates a consumer electronics device (CED) in accordance with one example of the disclosed embodiments.

FIG. 3 is a diagram that illustrates a consumer electronics device (CED) 135 in accordance with one example of the disclosed embodiments. FIG. 3 will be described with respect to FIGS. 1 and 2.

The CED 135 includes a computer 315, one or more long-range wireless communication interfaces 330 (e.g., cellular interfaces) that includes antenna(s) 333, ports 365 (e.g., USB ports), at least one short-range wireless communication interface 366 (e.g., Bluetooth and/or Wireless Local Area Network (WLAN) interface(s)) that includes antenna(s) 367, input/output devices 368, display(s) 370, audio system(s) 372, and a GPS receiver 376. The various components of the CED are communicatively coupled via one or more bus line(s) 305. The long-range wireless communication interface(s) 330, antenna 333, ports 365, short-range wireless communication interface(s) 366, input/output devices 368, display(s) 370, audio system(s) 372, and GPS receiver 376 are known in the art and will not be describe in detail herein.

The computer 315 includes at least one computer processor 320 that is in communication with a tangible, non-transitory processor-readable storage medium 325 (e.g., computer memory) by way of a communication bus 305 or other such computing infrastructure. The processor 320 is illustrated in one block, but may include various different processors and/or integrated circuits that collectively implement any of the functionality described herein. The processor 320 can include a central processing unit (CPU) that is in communication with the processor-readable storage medium 325.

As will be explained in greater detail below, the processor 320 can receive information from each of the other blocks illustrated in FIG. 3, process this information, and generate signals that convey selected information to any of the other blocks illustrated in FIG. 3. The processor 325 of the CED 135 can perform signal processing (e.g., digitizing, data encoding, modulation, etc.) as is known in the art.

The non-transitory processor-readable storage medium 325 can be any type of memory technology including any types described above with reference to processor-readable storage medium 225. The processor-readable storage medium 325 stores instructions 328 that, when executed by the processor, cause the processor 320 to perform various acts as described herein. The instructions 328 may be embodied in the form of one or more programs or applications that may be stored in the medium 325 in one or more modules.

In accordance with the disclosed embodiments, when the CED 135 is a CED associated with an owner of a vehicle 102, the instructions 328 stored in/on the non-transitory processor-readable storage medium 325 can include an application 329 (that includes processor-executable instructions executable by a processor, such as, the processor 320). The application 329 includes computer-executable instructions that when executed by a processor can be used to (1) set the owner's notification preferences, (2) turn a notification service on and off (or enable/disable), and (3) present/display notification reports and alert messages. Although the application 329 can run at a master CED of the owner, the application 329 can also run at another computer that is in communication with the vehicle.

Further details regarding the disclosed embodiments will now be described below with reference to FIG. 4.

Figure 4:
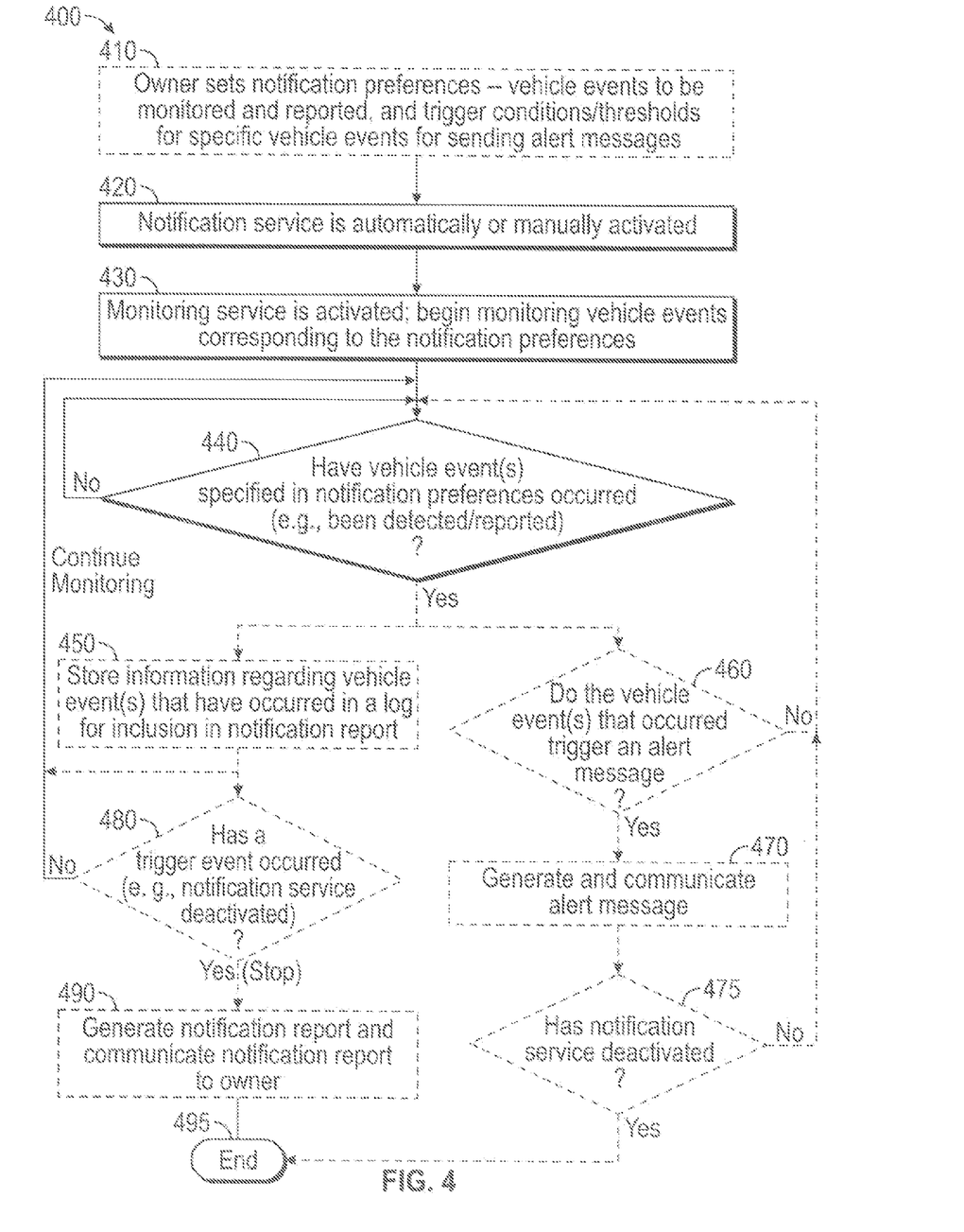
FIG. 4 is a flowchart illustrating a method for generating a notification report and/or alert message(s) in accordance with some of the disclosed embodiments.

FIG. 4 is a flowchart illustrating a method 400 for generating a notification report and/or alert message(s) in accordance with some of the disclosed embodiments. The method of FIG. 4 will be described with reference to FIGS. 1-3. As a preliminary mater, it should be understood that steps of the method 400 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 400 can be ended at any time. In certain embodiments, some or all steps of this process, and/or substantially equivalent steps, are performed by execution of processor-readable instructions stored or included on a processor-readable medium, for example. For instance, references to a processor performing functions of the present disclosure refer to any one or more interworking computing components executing instructions, such as in the form of an algorithm, provided on a processor-readable medium, such as a memory associated with the processor 220 of the onboard computer system 110 of vehicle 102, of the remote server 190, and/or of a CED 135 including a master CED. As used herein, the term "master," when used with reference to a CED, refers to a CED that is associated with an owner of the vehicle. Moreover, the "owner" of the vehicle can refer to someone else that the owner of the vehicle has designated as having master status (e.g., has permission to set notification preferences, receive alert messages concerning the vehicle, receive notification reports concerning the vehicle, etc.).

The method 400 begins at step 410 where the owner of the vehicle 102 sets notification preferences that specify, among other things, vehicle events that the owner wants to be monitored and reported. The owner can set the notification preferences via a browser application at computer 187 that communicates with a service hosted at web server 190, via an application 329 at the CED 135 that communicates with a service hosted at web server 190, or via an application 229 at a processor 220 of the vehicle. The owner's notification preferences can be saved or stored on web server, AHU 160 and/or CED 135. Block 410 is illustrated in dashed-line because this step is usually performed by the owner prior to the start of the method 400, meaning that the owner can set the notification preferences at any time prior to activation of a notification service at step 420. However, in some implementations, notification preferences can be updated after the notification service is activated at step 420 or the monitoring service is activated at step 430, in which case step 410 can be performed after step 420 or step 430 to allow the notification preferences to be updated while the notification service and monitoring service are active.

Notification Service Activation Phase

The method 400 then proceeds to an activation phase at steps 420 and 430.

At step 420, the notification service is activated. Depending on the implementation, the notification service can be activated either manually by a command from the owner, or automatically at the processor 220 by determining that an activation condition or activation event has occurred or been detected. Any of these activation mechanisms can be controlled by setting appropriate notification preferences.

The notification service can be manually activated by the owner at step 420, for example, by inputting information into the application 329 using a CED 135, by directly inputting information at the AHU 160 of the vehicle, or by inputting information into another computer 187 that is in communication with the AHU 160 (e.g., owner activates notification service via the application 329 on CED 135 by entering a command, a PIN or other code into the application 329 to enable the notification service, or by directly or indirectly communicating a signal/command to the AHU 160 to enable the notification service). For instance, in one embodiment, a signal or command can be communicated from the owner's CED 135 to a web server 190 and from the web server 190 to the AHU 160 to activate the notification service. In one implementation, a special key or key fob for the vehicle is provided that the owner can give to others when the owner allows them to access the vehicle, and whenever this special key or fob is used, this will automatically active the notification service.

The notification service can be automatically activated at the processor 220 by determining that an activation condition or event has occurred or been detected. For example, in one implementation, the notification service can be automatically activated at the processor 220 whenever a specific CED connects to a wireless or wired interface of the vehicle. In another implementation, the notification service can be automatically activated at the processor 220 whenever a special key or key fob is present in the vehicle or is used to access the vehicle.

Monitoring Phase

Following activation of the notification service (at step 420), a monitoring service is activated at the processor 220 at step 430, and the processor 220 enters a monitoring phase. As will be described below, during the monitoring phase, the processor 220 starts monitoring for indications (e.g., triggers or signals) that any of the vehicle events specified in the notification preferences have occurred. Depending on the implementation, this monitoring phase can continue until a trigger event occurs (i.e., when optional step 480 is performed), or run indefinitely.

At step 440, the processor 220 beings monitoring to determine whether any vehicle events (as specified by the notification preferences set at step 410) have occurred. During each iteration of step 440, the processor 220 can determine whether any indications have been received that any of the vehicle events have occurred.

In one embodiment, the processor 220 monitors things such as the GPS receiver 276, vehicle sensors 240, vehicle diagnostic systems 250, and vehicle systems, sub-systems and electrical infrastructure 255 (including any information communicated over the CAN bus), and any other vehicle 102 element, component or module that communicates information over the CAN bus, to determine whether a vehicle event (as specified by the notification preferences set at step 410) has occurred that is specified in the notification preferences. In this context, "monitoring" can mean that vehicle events (1) have been reported to the processor 220, (2) have been detected by the processor 220 based on information received, or (3) have been detected by the processor 220 based on information that the processor 220 receives and then processes to make a determination. For example, the processor 220 can monitor information/data received from various subs-systems, and optionally process that information/data, to determine whether it corresponds to vehicle events. Further, in some embodiments, monitoring can include comparing information/data for a particular vehicle event to a corresponding threshold and/or determining whether the information/data for a particular vehicle event meets some condition prior to determining that a particular vehicle event has occurred.

After step 440, the method 400 can proceed to step 450 only, or can proceed to step 460 only, or can proceed to both steps 450 and 460. Blocks 450, 480 and 490 are illustrated in dashed-lines because these steps can be optional and are not performed in some embodiments in which only the alert message feature of steps 460 and 470 is enabled. In addition, it is noted that blocks 460 and 470 are illustrated in dashed-lines because they can also be optional, and are not performed in some embodiments when only the notification reporting feature of steps 450, 480 and 490 is enabled. In another embodiment, that will now be described, all of the steps 450-490 are performed. Depending on the implementation, steps 450 and 480 can take place in parallel (or simultaneously) with steps 460 and 470, or steps 450 and 480 and steps 460 and 470 can also be performed in near parallel (i.e., sequentially but substantially in parallel).

Notification Reporting

Each time the processor 220 determines (at step 440) that a vehicle event specified in the notification preferences has occurred (e.g., vehicle events have been detected by or reported to the processor 220), the method 400 proceeds to step 450, where the processor 220 stores a record of the vehicle event(s) that has/have occurred in a vehicle event detection log 231 for inclusion in notification report. Each record stored by the processor 220 includes information regarding a particular vehicle event that has occurred. Depending on the implementation, following step 450, the method 400 can either loop back to step 440, proceed to step 480, or directly proceed to step 490 without performing step 480.

Optional Trigger Event Before Generation of Notification Report

Block 480 is illustrated in dashed-line because it is optional and is not performed in some embodiments. When step 480 is not performed, the method 400 either loop from step 450 back to step 440, or proceeds directly from step 450 to step 490.

When step 480 is implemented, each time the processor 220 stores information regarding one of the vehicle event(s) in the log 231, the processor 220 determines whether a trigger event has occurred at step 480. The trigger event for generating a notification report can vary depending on the implementation. For example, a notification report can be generated (1) periodically or at regular intervals, (2) in response to a request from the owner (or on-demand), or (3) automatically in response to the occurrence of a generation condition or event (e.g., expiration of a timer, occurrence of a significant condition or event specified by the owner in the notification preferences such as an airbag has gone off, etc.) such as receiving an indication at the processor 220 that condition or even has occurred, receiving an indication at the processor 220 that a timer has reached a particular time or expired, receiving an indication at the processor 220 that a counter has reached a count, receiving an indication at the processor 220 that the notification service has been deactivated/disabled.

When the processor 220 determines that a trigger event has not occurred at step 480, the method 400 loops back to step 440, where the processor 220 continues to determine whether any vehicle events specified in the notification preferences have occurred. By contrast, when the processor 220 determines that a trigger event has occurred at step 480, the method 400 can proceed to step 490.

Notification Report Generation and Communication

At step 490, the processor 220 generates a notification report, and communicates the notification report to owner. In some implementations, the notification report is sent along with this alert message so that the owner knows that the notification report is available for review. The notification report comprises the records for each of the vehicle events that are stored in the vehicle event detection log 232, and can include additional information such as the state of certain systems during the vehicle event, the time of the occurrence of the vehicle event, the location of the occurrence of the vehicle event, etc. As with the alert messages, the notification report can be communicated to a computer associated with the owner of the vehicle 102. In one embodiment, the processor 220 communicates the notification report to the owner's CED 135 (or other CED 135 associated with the owner) and/or to a server 190 that is accessible by the owner via another computer 187 that the owner has access to. In some implementations, depending on the notification preferences, a message that includes the notification report (or that indicates that the notification report is available and ready to be viewed) can be communicated to the owner via e-mail, via text or short message service (SMS), or via an automated phone call, for example, using a pre-recorded message. In other implementations, the notification report can be communicated to the owner's CED over a wired connection (e.g., USB) or short-range wireless communication link (e.g., Bluetooth or WLAN communication link).

The method 400 then ends at step 495.

Alert Messaging

Each time the processor 220 determines (at step 440) that a vehicle event specified in the notification preferences has occurred (e.g., vehicle events have been detected by or reported to the processor 220), the method 400 proceeds to step 460, the processor 220 can determine, based on the notification preferences, whether any vehicle event(s) that has/have occurred (at step 440) should trigger generation of an alert message by the processor 220. In other words, for each of the vehicle event(s) that have occurred, the processor 220 determines whether that vehicle event should trigger generation of an alert message. In general, the determination at step 460 can involve comparing information for that particular detected/reported event to one or more thresholds specified in the notification preferences, or determining whether that particular detected/reported event satisfies a condition or status specified in the notification preferences. Some specific triggers for generating alert messages can include at least one of: comparing a value for a vehicle event to one or more thresholds; receiving an indication based on a vehicle event that a condition or event has occurred; processing information corresponding to a vehicle event to determine that a condition or event has occurred; determining that a timer for a vehicle event has reached a certain value or expired; determining that a counter for a vehicle event has reached a certain value (including zero); determining that the vehicle is at a particular location or place; or any combination of these triggers.

Alert Message Generation and Communication

When the processor 220 determines that any vehicle event(s) (from step 440) should trigger generation of an alert message, at step 470, the processor 220 can generate the alert message(s) and communicate the alert message(s) to a remote computer associated with the owner of the vehicle 102 (e.g., CED 135 and/or remote computer 187 as two non-limiting examples). Here, a remote computer refers to a computer that is not part of the vehicle, and that is normally located outside the vehicle unless its portable and thus capable of being carried into the vehicle. In other words, at step 470 the processor 220 can generate an alert message for each of the vehicle event(s) that it has determined to satisfy a trigger condition specified in the notification preferences.

In one embodiment, the alert message(s) can be sent, for example, to a server 190, and the server 190 can forward the alert message(s) to a computer 187 that is accessible by the owner, and/or to the application 329 that is running on the owner's CED 135 (or any other CED 135 associated with the owner), to notify the owner of the alert condition/event. In some implementations, the alert message(s) can include additional information such as information associated with the vehicle event, the current location/status of the vehicle 102 (moving, stationary, number of occupants, etc.). Depending on the owner's notification preferences, the alert message(s) can be communicated to the owner via e-mail, text or short message service (SMS), or via an automated phone call, for example, using a pre-recorded message.

In one embodiment, after step 470, the processor 220 can determine (at step 475) whether the notification service has been deactivated. The processor 220 can receive an indication that the notification service has been deactivated/disabled. This indication can be generated a number of different ways. The notification service can be deactivated or disabled manually by the owner. For example, in one implementation, the notification service can be manually deactivated by the owner by entering a command, a PIN or other code into the application 329 to disable the notification service, or by communicating a signal/command to the notification service. Alternatively, the notification service can be deactivated or disabled automatically at the processor 220 by determining that a deactivation condition or event has occurred or been detected per a setting in the notification preferences. For instance, in one embodiment, the notification service can be automatically deactivated/disabled when it is determined that the vehicle 102 has reached a particular location/destination, when the vehicle 102 is determined to be within a certain proximity of the owner's CED 135, when it is determined that the AHU 160 of the vehicle 102 has established a short-range wireless connection with the owner's CED 135 and the owner's CED 135 re-pairs with the AHU 160 of the vehicle 102, when it is determined that a timer has expired, etc. Whenever the notification service is automatically deactivated/disabled, an alert message can be sent to the owner (if requested through notification preferences) so that the owner can be notified When the processor 220 determines that the notification service has not been deactivated, the method 400 loops back to 440. When the processor 220 determines that the notification service has been deactivated, the method 400 proceeds to step 495 where the method 400 ends at step 495.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the description above includes a general context of processor-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein, various such structures may be separated or combined in various combinations across the various computing platforms described herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention.

The above-described embodiments are merely exemplary illustrations of implementations set forth for a clear understanding of the principles of the disclosure. The exemplary embodiments are only examples, and are not intended to limit the scope, applicability, or configuration of the disclosure in any way. While exemplary embodiments have been presented in the foregoing detailed description, it should be appreciated that a vast number of variations exist. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof. All such variations, modifications, and combinations are included herein by the scope of this disclosure and the following claims.

What is claimed is:

1. A method, comprising:
   inputting information into an application that executes at a consumer electronics device to activate a notification service at a processor of a vehicle, wherein the consumer electronics device is external to the vehicle and associated with an owner of the vehicle;
   in response to receiving an indication that the notification service has been activated at the processor of the vehicle via the application that executes at the consumer electronics device: activating a monitoring service, at the processor of the vehicle, that is configured to monitor for indications that any vehicle events specified in notification preferences have occurred while the notification service is activated;
   upon activation of the monitoring service, monitoring via the processor for indications that any vehicle events specified in notification preferences have occurred;
   determining, at the processor based on the notification preferences, whether the vehicle event that has occurred is to trigger an alert message;
   generating an alert message at the processor when the processor determines that the vehicle event that has occurred is to trigger communication of the alert message; and
   communicating the alert message to a remote computer.

2. A method according to claim 1, further comprising:
   each time the processor determines that a vehicle event specified in the notification preferences has occurred, storing a record of that vehicle event in a vehicle event detection log; and
   generating, at the processor, a notification report comprising records for each of the vehicle events that are stored in the vehicle event detection log; and
   communicating the notification report to the remote computer.

3. A method according to claim 2, further comprising:
   determining, at the processor, whether a trigger event has occurred; and
   wherein the step of generating the notification report at the processor, comprises:
   generating the notification report at the processor in response to determining at the processor that a trigger event has occurred.

4. A method according to claim 3, further comprising:
   in response to determining at the processor that a trigger event has not occurred, continuing to determine, at the processor, whether any vehicle events specified in the notification preferences have occurred.

5. A method according to claim 1, wherein the notification preferences are set by an owner of the vehicle and specify vehicle events that the owner wants to be monitored and reported when a monitoring service is activated, and wherein the remote computer is associated with the owner.

6. A method according to claim 5, wherein the notification preferences for the notification report further comprise: types of vehicle events to be logged in a vehicle event detection log and included in the notification report; trigger conditions/thresholds associated with specific vehicle events which are evaluated to determine whether alert messages should be sent; parameters for logging information about vehicle events in the notification report; format of the notification reports; delivery type of the notification reports; conditions for delivery of the notification reports to the owner; and destination address of the remote computer that is to receive the notification report.

7. A method according to claim 1, wherein the notification preferences for alert messages comprise: types of vehicle events that are to trigger the alert messages; trigger conditions/thresholds associated with specific vehicle events which are evaluated to determine whether alert messages should be sent; parameters for vehicle events that trigger communication of the alert messages; format of the alert messages; delivery type of the alert messages; conditions for delivery of alert messages; and destination address of the remote computer that is to receive the alert messages.

8. A method according to claim 1, further comprising:
   inputting information into the application that executes at the consumer electronics device to deactivate the notification service, wherein deactivation of the notification service deactivates the monitoring service.

9. A method according to claim 1, wherein the vehicle events specified in notification preferences comprise: vehicle events that indicate that a portion of the vehicle has been accessed.

10. A method according to claim 9, wherein the step of monitoring via the processor for indications that any vehicle events specified in notification preferences have occurred that indicate that a portion of the vehicle has been accessed, comprises:
    receiving, at the processor, a signal from a sensor that indicates that an engine of the vehicle has been started or turned off;

receiving, at the processor, a signal from a sensor that indicates that a door of the vehicle has been opened or closed, or unlocked or locked; and receiving, at the processor, a signal from a sensor that indicates that a compartment of the vehicle has been opened or closed, or unlocked or locked.

11. A method according to claim 1, wherein the step of monitoring via the processor for indications that any vehicle events specified in notification preferences have occurred, comprises:

receiving, at the processor, a signal from a crash sensor that indicates that the vehicle has been involved in a crash;

receiving, at the processor, a signal from an air bag sensor that indicates that an airbag has been deployed; and receiving, at the processor, a signal from an infrared sensor that indicates road temperature, or the presence of ice or snow on the road.

12. A system, comprising:
a remote computer; and
a consumer electronics device external to the vehicle, associated with an owner of the vehicle, and being configured to: execute an application that is configured to generate, in response to input information, a signal;
a vehicle comprising a processor configured to:
receive the signal generated by the application, and activate, in response to the signal, a notification service at the processor of the vehicle;
activate, in response to receiving an indication that the notification service has been activated at the processor of the vehicle via the application that executes at the consumer electronics device, a monitoring service, at the processor of the vehicle, that is configured to monitor for indications that any vehicle events specified in notification preferences have occurred while the notification service is activated;
monitor, upon activation of the monitoring service, for indications that any vehicle events specified in notification preferences have occurred;
for each vehicle event that is determined to have occurred: determine whether that vehicle event is to trigger an alert message from the processor; and
generate the alert message when the processor determines that the vehicle event that has occurred that is to trigger communication of the alert message; and
communicate the alert message to the remote computer.

13. A system according to claim 12, the vehicle further comprising:
a memory configured to store a vehicle event detection log; and
wherein the processor is further configured to:
each time the processor determines that a vehicle event specified in the notification preferences has occurred: store a record for that vehicle event in the vehicle event detection log; and
generate a notification report comprising the records for each of the vehicle events that have occurred and that are stored in the vehicle event detection log; and
communicate the notification report to the remote computer.

14. A system according to claim 13, wherein the processor is further configured to:
determine whether a trigger event has occurred; and
generate the notification report when it is determined that the trigger event has occurred, and continue to determine whether any vehicle events specified in the notification preferences have occurred when it is determined that the trigger event has not occurred.

15. A system according to claim 12, wherein the notification preferences are set by an owner of the vehicle and specify vehicle events that the owner wants to be monitored and reported when a monitoring service is activated, and wherein the remote computer is associated with the owner and is not part of the vehicle.

16. A system according to claim 15, wherein the notification preferences for the notification report further comprise: types of vehicle events to be logged in a vehicle event detection log and included in the notification report; trigger conditions/thresholds associated with specific vehicle events which are evaluated to determine whether alert messages should be sent; parameters for logging information about vehicle events in the notification report; format of the notification reports; delivery type of the notification reports; conditions for delivery of the notification reports to the owner; and destination address of the remote computer that is to receive the notification report.

17. A system according to claim 12, wherein the notification preferences for alert messages comprise: types of vehicle events that are to trigger the alert messages; trigger conditions/thresholds associated with specific vehicle events which are evaluated to determine whether alert messages should be sent; parameters for vehicle events that trigger communication of the alert messages; format of the alert messages; delivery type of the alert messages; conditions for delivery of alert messages; and destination address of the remote computer that is to receive the alert messages.

18. A system according to claim 12, wherein the remote computer is a portable consumer electronics device associated with the owner.

19. A vehicle, comprising:
a processor configured to:
receive a signal from a consumer electronics device, wherein the signal is generated in response to information input into an application that executes at the consumer electronics device, and wherein the consumer electronics device is external to the vehicle and associated with an owner of the vehicle;
activate, in response to the signal, a notification service;
activate, in response to receiving an indication that the notification service has been activated at the processor of the vehicle via the application that executes at the consumer electronics device, a monitoring service, at the processor of the vehicle, that is configured to monitor for indications that any vehicle events specified in notification preferences have occurred while the notification service is activated;
upon activation of the monitoring service: monitor for indications that any vehicle events specified in notification preferences have occurred, wherein the notification preferences are set by an owner of the vehicle and specify vehicle events that the owner wants to be monitored and reported when a monitoring service is activated;
when the processor determines that a vehicle event specified in the notification preferences has occurred: determine, based on the notification preferences, whether the vehicle event that has occurred is to trigger an alert message from the processor;
generate the alert message when the processor determines that the vehicle event is to trigger communication of the alert message; and
communicate the alert message to a remote computer that is not part of the vehicle.

20. A vehicle according to claim 19, further comprising:
a memory configured to store a vehicle event detection log; and
wherein the processor is further configured to:
- store in the vehicle event detection log, each time the processor determines that a vehicle event specified in the notification preferences has occurred, a record for that vehicle event; and
- generate a notification report comprising the records for each of the vehicle events that are stored in the vehicle event detection log; and
- communicate the notification report to the remote computer.

21. A vehicle according to claim 20, wherein the processor is further configured to:
- determine whether a trigger event has occurred; and
- continue to determine whether any vehicle events specified in the notification preferences have occurred when it is determined that the trigger event has not occurred; and
- generate the notification report when it is determined that the trigger event has occurred.

22. A vehicle according to claim 19, wherein the notification preferences for the notification report further comprise: types of vehicle events to be logged in a vehicle event detection log and included in the notification report; trigger conditions/thresholds associated with specific vehicle events which are evaluated to determine whether alert messages should be sent; parameters for logging information about vehicle events in the notification report; format of the notification reports; delivery type of the notification reports; conditions for delivery of the notification reports; and destination address of the remote computer that is to receive the notification report; and
wherein the notification preferences for alert messages comprise: types of vehicle events that are to trigger the alert messages; trigger conditions/thresholds associated with specific vehicle events which are evaluated to determine whether alert messages should be sent; parameters for vehicle events that trigger communication of the alert messages; format of the alert messages; delivery type of the alert messages; conditions for delivery of alert messages; and destination address of the remote computer that is to receive the alert messages.

* * * * *